Aug. 21, 1934.   E. B. GARGEL   1,971,178
SPEED INDICATION MECHANISM
Filed Nov. 28, 1932   2 Sheets-Sheet 1
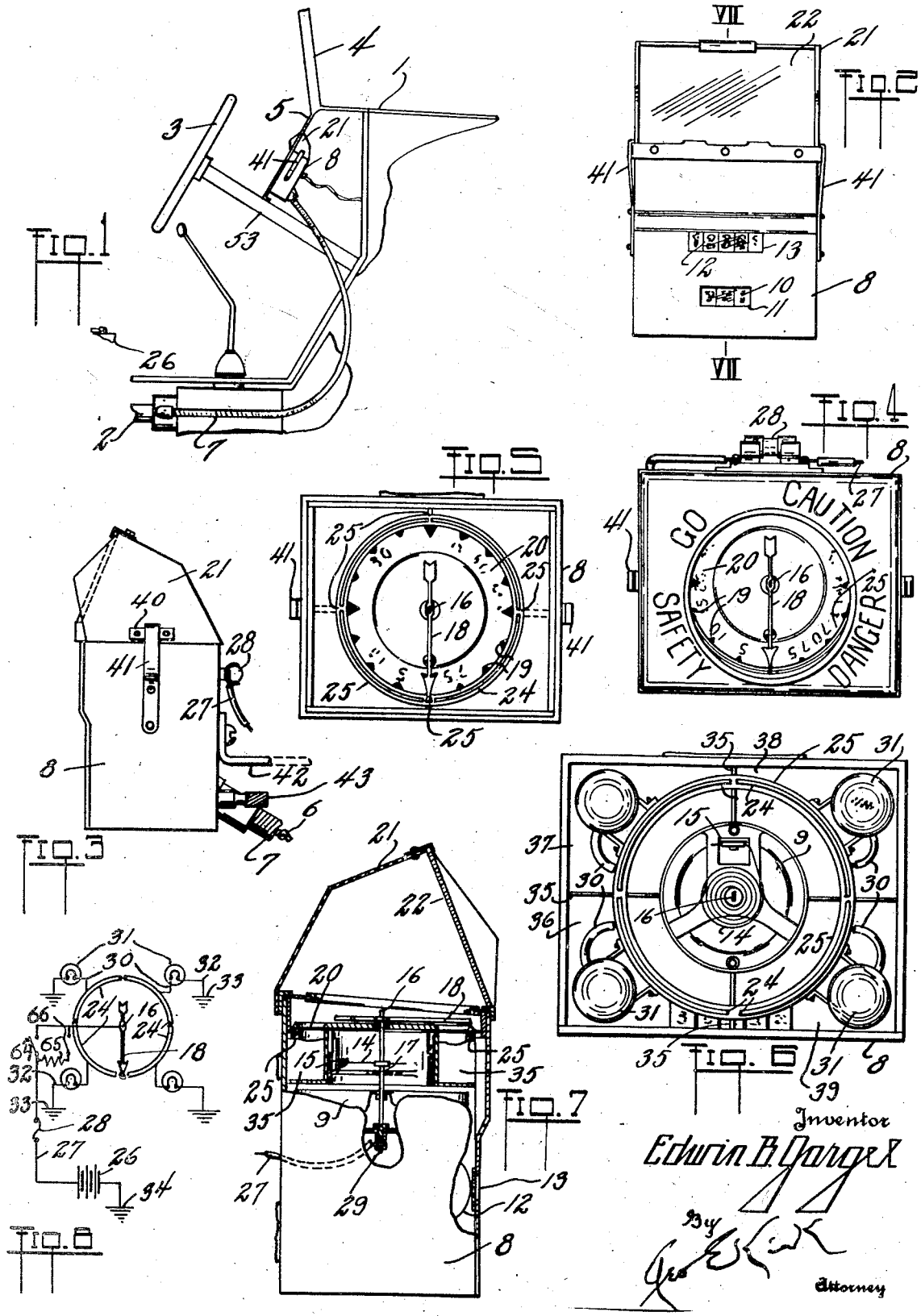
Inventor
Edwin B. Gargel
By
Attorney Aug. 21, 1934.  E. B. GARGEL  1,971,178
SPEED INDICATION MECHANISM
Filed Nov. 28, 1932   2 Sheets-Sheet 2
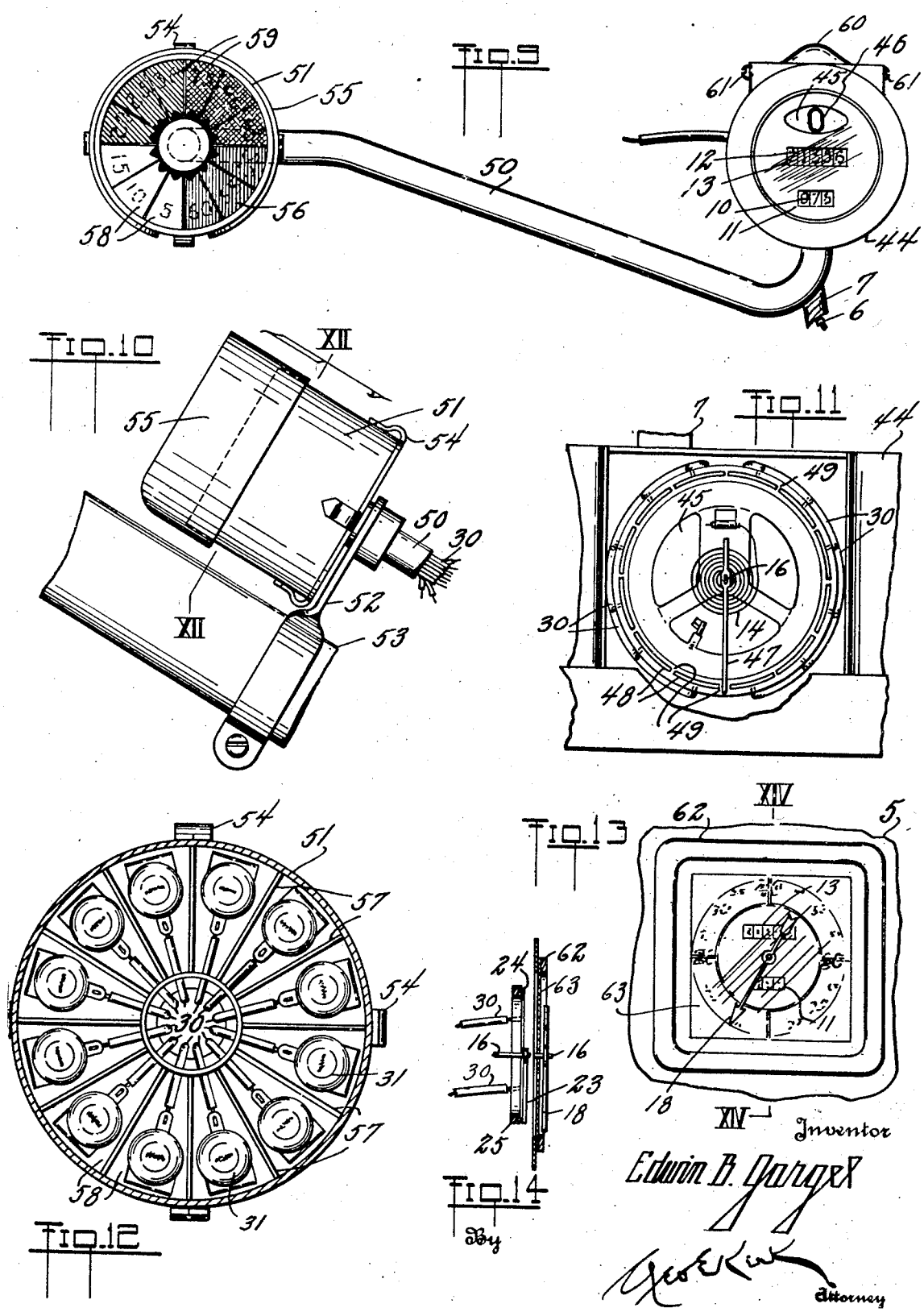

Patented Aug. 21, 1934

1,971,178

UNITED STATES PATENT OFFICE 1,971,178

SPEED INDICATION MECHANISM

Edwin B. Gargel, Toledo, Ohio

Application November 28, 1932, Serial No. 644,596

1 Claim. (Cl. 177—311.5)

This invention relates to visible disclosure of speed.

This invention has utility in connection with the operation of motor vehicles for readily disclosing to the operator speed conditions independently of distracting the attention of the operator from normal observation and control.

Referring to the drawings:

Fig. 1 is a fragmentary view of an automobile having an embodiment of the invention incorporated therewith;

Fig. 2 is a front view of the device as installed in Fig. 1;

Fig. 3 is a side elevation of the disclosure in Fig. 2;

Fig. 4 is a plan view of the device of Fig. 2 with the hood removed;

Fig. 5 is a view of the device of Fig. 4 with the dial boundary section of Fig. 4 removed to show the switch mechanism therebelow;

Fig. 6 is a view of the device of Fig. 5 with the switch device of Fig. 5 removed to show the mechanism therebelow;

Fig. 7 is a partial section on the line VII—VII, Fig. 2;

Fig. 8 is a wiring diagram of the device of Fig. 2;

Fig. 9 is an embodiment of the invention as an extension from the speedometer;

Fig. 10 is a side view of the extension device;

Fig. 11 is a view of the switch mechanism of the device of Fig. 9, looking down thereon with certain cover portions removed at the right;

Fig. 12 is a section on the line XII—XII, Fig. 10;

Fig. 13 is a view of the disclosing means incorporated with features of the speedometer as at the right in Fig. 9; and Fig. 14 is a section on the line XIV—XIV, Fig. 13.

Motor vehicle 1 is shown as having propeller shaft 2, steering wheel 3, windshield 4, and instrument board or dash 5. From the propeller shaft 2 transmission 6 through conduit 7 extends to housing 8, there actuating speedometer mechanism 9 disclosing trip mileage 10 at window 11, and total mileage or distance 12 at window 13. Additionally, this speedometer mechanism is effective for disclosing speed condition through the action of torsion spring 14 having fixed anchor 15. This torsion spiral spring extends to post 16 mounted in bearing 17. The torsion action on this post or pivot pin 16 serves to throw indicator 18 to scale points 19 on dial 20. The graduations of these scale points 19 may be in miles per hour. As herein disclosed, this dial 20 is at the upper portion of the housing 8, and has thereover hood 21 with window 22. This hood 21 serves to restrict the interference of outside illumination. Thus in the housing there is located at the dial 20 the pointer 18 fixedly mounted on the pin 16 and concentric with the dial 19. This pointer 18 in its travel engages series of contact portions 24 isolated from each other by insulation 25.

Motor vehicle 1 is shown as provided with battery 26 as a source of electric current. The circuit extends from battery 26, thru conductor 27, fuse 28, thru the housing to the connection 29. From this point the circuit extends to pin 16 and its arm 18 which are made of conducting material. Arm 18 may contact the several contacts 24 so that the circuit may continue thru the several contacts 24, electrical conductors 30, to electric bulbs 31 and thence by lines 32 to ground 33 completing circuit with the ground 34 from the battery 26.

The insulation sections 24 are coincident with partitions 35, say for white light chamber 36, green light chamber 37, amber light chamber 38, and red light chamber 39; which on the scale graduations, may mean for disclosing speed to twenty miles an hour in the "safe" or white section, twenty to forty miles an hour in the green or "normal" driving rate section, "caution" in the speed of from forty to sixty miles an hour in the section 38, and "danger" in the chamber illuminated by the red light, chamber 38. Additionally, there may be coincident legend at the dial 20.

It is thus seen in the operation hereunder, with the motor vehicle not traveling, the needle 23 is on the insulation 25, with no illumination for the dial. Once the motor is started, there is a white illumination up to the speed of twenty miles, which is maintained as long as the vehicle is within such speed range, and automatically shut off as the vehicle discontinues traveling. The location of the housing 8 is such that the operator of the vehicle at the steering wheel 3 need not shift observation for careful driving, but may at all times be fully apprised as to traffic conditions by looking through the windshield 4.

Notwithstanding such attention to the road, the hood 21 with its side cheeks projecting forward of the window or transparency 22 confines the illumination so that it is effective to catch the eye of the operator without the operator taking vision off the road. This check for the operator discloses by the color scheme, the range in which there is progress rate or travel; the color shifting away from white also apprises the driver of just the actual condition of speed. More definite checking of course can be had by looking at the notation 19 on the dial 20.

These locations for the color partitions may be according to traffic regulations as enforced or suggested, and thereby give assistance to the driver in complying with safety requirements at all times. The hood 21 is readily removed for access to the parts assembled therebelow, such as for replacement of bulbs. On replacing the hood, lugs 40 are engaged by spring hooks 41 fixed with the housing 8, and there is thus a simple, substantial assembly. Bracket 42 may mount the housing 8. Stem 43 may be operated to set the trip or distance disclosing means. The respective bulbs 31 may be of distinctive colors to correspond with the notations, or the partition chambers may have colored wall, or the transparency over the chamber may be given the color scheme for the visual assistance of the operator. As the arm 18 crosses a partition region, a succeeding light 31 is thus turned on before the previous light is extinguished. This is due to the broadened terminus of the arm which insures illumination of the dial at all speeds of travel.

The transmission 6 through the conduit 7, instead of extending to the housing 8, may extend to housing 44 (Fig. 9) having trip mileage disclosing means 10 at the window 11, and having total mileage disclosing means 12 at the window 13. Additionally, there is indicator drum 45 with graduations 46 thereon responding to the dial 20. This drum 45 is mounted on the conductor pin 16 actuated by the spiral torsion spring 14. This pin 16 carries indicator arm or conductor 47 serving as does the arm 18 and shifting from contacts 48 as separated from each other by insulation 49. These contacts 48 are in circuits as are the contacts 24. However, the lines 30 therefrom are herein shown extending through conduit 50 to a location spaced from the housing 44 to housing 51 mounted by bracket 52 on steering column 53 for the steering wheel 3. This bracket 52 has spring clip 54 mounting this housing 51. This housing 51 is provided with shield or hood 55 about window 56 above partitions 57 for the light bulbs 31 in chambers 58 shown as for disclosing notations 59 of more exact mileage showing corresponding to that of the indicator 18 as well as the chamber common color effect of the chamber 36, etc.

This housing 44 in the section mounting the arm 47 and providing the contacts 48, is under cap 60 mounted by screws 61 on the housing 44.

The conductor pin 16 carrying the indicator 18 and a conductor arm 23 may be located in housing 62 (Fig. 13) with trip window 11 on one side, and total mileage window 13 on the other side. With dial 63 about these notations of the speedometer, and different illuminated sections responding at chambers 36, 37, 38, 39, there is a compact disclosure hereunder and thus brings the entire illuminous signal as a unit to the attention of the driver or operator of the vehicle.

It is thus seen there is herein given to speedometer data an increased effectiveness upon the attention of the driver of the vehicle without the necessity of distracting the driver from normal driving duties, and that such embodiment may conform to features of simplicity in installation with maximum advantages for utilization.

While as hereinbefore discussed, it is normally contemplated that the speed disclosing signal herein may be automatically operative at all speeds of the vehicle, provision may be adopted for rendering the signal ineffective. To such end switch 64 (Fig. 8) may be opened. If there be desire for less intense illumination of the dial by the bulbs at night than in the daytime, this is accomplished by throwing in resistance 65 by closing the switch 66, in lieu of the switch 64.

What is claimed and desired to secure by Letters Patent is:

A speedometer circuit-closing means embodying a pivotally mounted indicator element, a housing therefor, an axis pin for and rotatable with the element in the housing, an insulation mounting for the pin, an annular insulation rim which is overhung by the outer terminus of the element, a series of contacts mounted in said rim concentric with the axis pin, said rim being spaced from the housing, indicator means complementary to the element and extending along the rim, partitions between the external walls of said housing and the rim whereby chambers are formed having the housing and the rim as walls thereof, separate lights in said chambers at the vicinity of the respective contacts, conductors between each lamp and its corresponding contact, and notation-disclosing covering means for the chambers and element rendered visible by said lights said notation-disclosing means being along one side of the rim and said indicator means extending along the other side of said rim.

EDWIN B. GARGEL.